US008174813B2

(12) United States Patent
Stroede et al.

(10) Patent No.: US 8,174,813 B2
(45) Date of Patent: May 8, 2012

(54) PROTECTION PATCH PANEL

(75) Inventors: Andrew J. Stroede, Frankfort, IL (US); Scott R. Hartman, Oak Forest, IL (US); Darren J. Reigle, Frankfort, IL (US); Ronald A. Nordin, Naperville, IL (US); Masud Bolouri-Saransar, Orland Park, IL (US); Timothy M. Nitsch, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 12/987,598

(22) Filed: Jan. 10, 2011

(65) Prior Publication Data

US 2011/0102959 A1 May 5, 2011

Related U.S. Application Data

(63) Continuation of application No. 12/047,939, filed on Mar. 13, 2008, now Pat. No. 7,869,179.

(60) Provisional application No. 60/894,766, filed on Mar. 14, 2007.

(51) Int. Cl.
*H02H 1/00* (2006.01)

(52) U.S. Cl. ........................................ 361/119; 361/117

(58) Field of Classification Search ........... 361/117–120
See application file for complete search history.

(56) References Cited

U.S. PATENT DOCUMENTS 7,869,179 B2 * 1/2011 Stroede et al. ................ 361/119

* cited by examiner

*Primary Examiner* — Danny Nguyen
(74) *Attorney, Agent, or Firm* — Robert A. McCann; Zachary J. Smolinski; Christopher S. Clancy

(57) ABSTRACT

An access control system dissipates voltage transients while allowing access control equipment to operate normally. The access control system utilizes an isolation patch panel which is provided with circuitry to prevent voltage transients from damaging access control equipment, while also enabling the access control equipment to be wired with standard Ethernet cabling.

5 Claims, 4 Drawing Sheets

PROTECTION PATCH PANEL

CROSS-REFERENCE TO RELATED APPLICATIONS

This application is a continuation of U.S. patent application Ser. No. 12/047,939, filed Mar. 13, 2008, which claims priority to U.S. Provisional Application No. 61/027,965, filed Feb. 12, 2008, the subject matter of which is hereby incorporated by reference in its entirety.

BACKGROUND

Underwriters Laboratories standard 294 (UL 294) entitled "Standard for Access Control System Units Equipment" requires each piece of equipment used for access control to pass a transient voltage test (TVT). Specifically, UL 294 requires an access controller to continue to operate while a 2400V transient voltage is present on any communications cable entering or leaving a room. A 2400V transient voltage far exceeds the limits of an Ethernet communications port. As a result, the TVT requirement of UL 294 restricts devices such as credential readers, door locks, request-to-exit devices, etc. from migrating to TCP/IP without transient voltage protection.

The 2400 TVT applies a 60 ms, 2400V spike between every combination of wires in a cable connecting to an access controller. Due to the proximity of the pins in an Ethernet jack, the 2400V TVT destroys the jack, leaving the access controller inoperable. In order to pass the TVT, an access controller must be able to operate normally during and after the 2400V TVT has been applied. Therefore, there is a need to create a device that has the ability to dissipate a transient while allowing an access controller to operate normally.

BRIEF DESCRIPTION OF THE DRAWINGS

Exemplary embodiments are described below with reference to the attached drawings.

DETAILED DESCRIPTION

A method is provided for isolating a segment of a TCP/IP network from transient voltages. In one embodiment, a TCP/IP network is isolated from 2400V transient voltages in compliance with the UL 294 standard. In another embodiment, a method is provided for suppressing a transient voltage both in a network rack containing network equipment such as a network switch and at a remote location, e.g., to satisfy the UL 294 standard.

Figure 1:
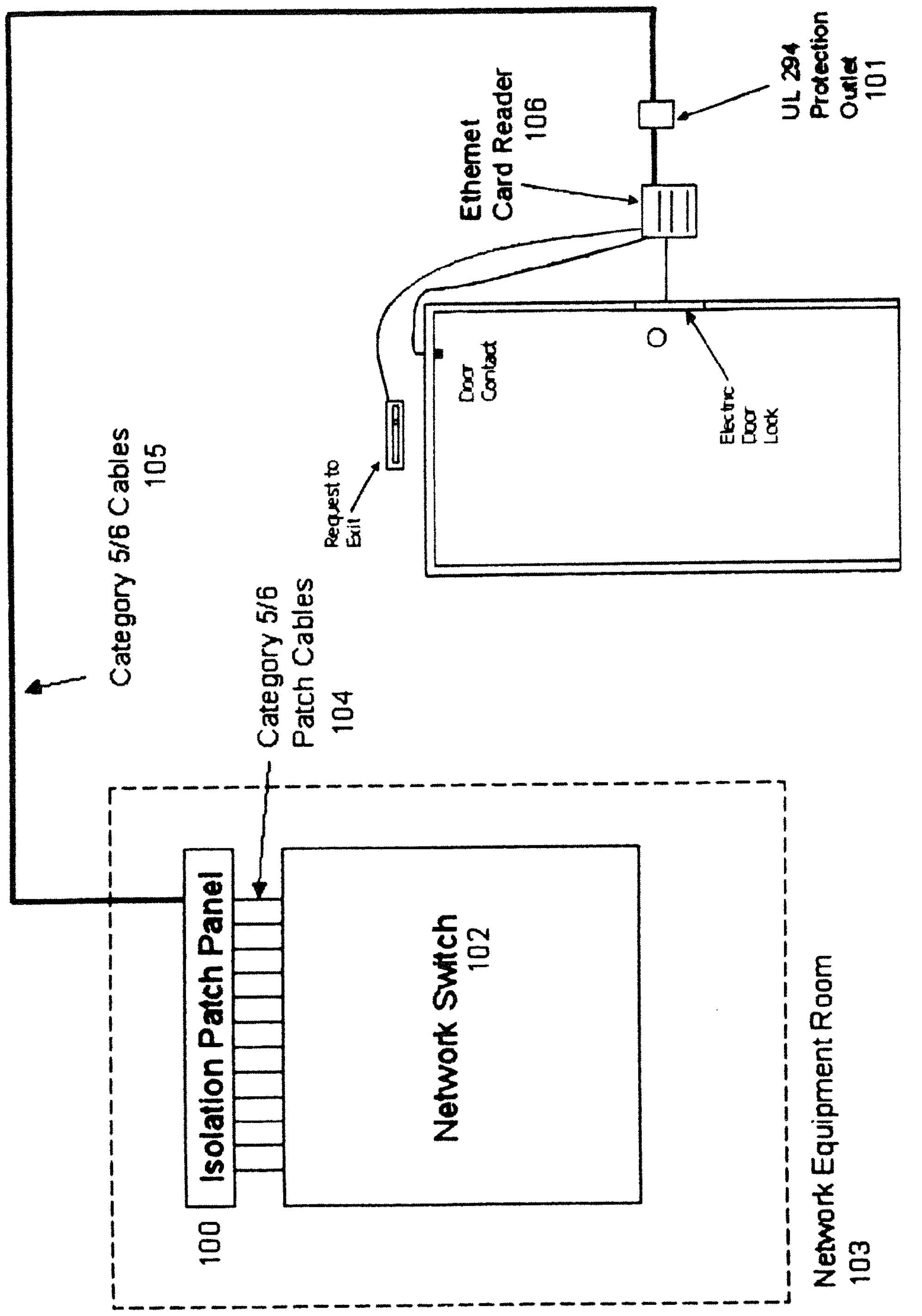
FIG. 1 shows a network topology for protecting network equipment and access controllers from a transient voltage according to one embodiment.

One embodiment of a network topology for protecting both network equipment and access controllers from a transient voltage is shown in FIG. 1. As shown, the network equipment includes an isolation patch panel 100 and a network switch 102. The isolation patch panel 100 is located in a network equipment room 103. The isolation patch panel 100 protects the network switch 102. Category 5/6 patch cables 104 connect the network switch 102 and the isolation patch panel 100. A UL 294 protection outlet 101 is located near a door 109, which may be remote from the network equipment room 103. The UL 294 protection outlet 101 connects an Ethernet Card Reader 106 and the isolation patch panel 100. The Ethernet Card Reader 106 engages or disengages an electric door lock 108 on the door 109. The Ethernet Card Reader 106 is also connected to a door contact 111, which provides data on whether the door 109 is open or closed, and a Request to Exit (REX) device 107. The UL 294 protection outlet 101 and the Ethernet card reader 106 are connected to the isolation patch panel 100 via a single category 5/6 cable 105. This topology is compliant with the requirements of UL 294 and provides protection to the network equipment 102 from transient voltages introduced to one of the category 5/6 cables disposed between the door 109 and the isolation patch panel 100.

Figure 2:
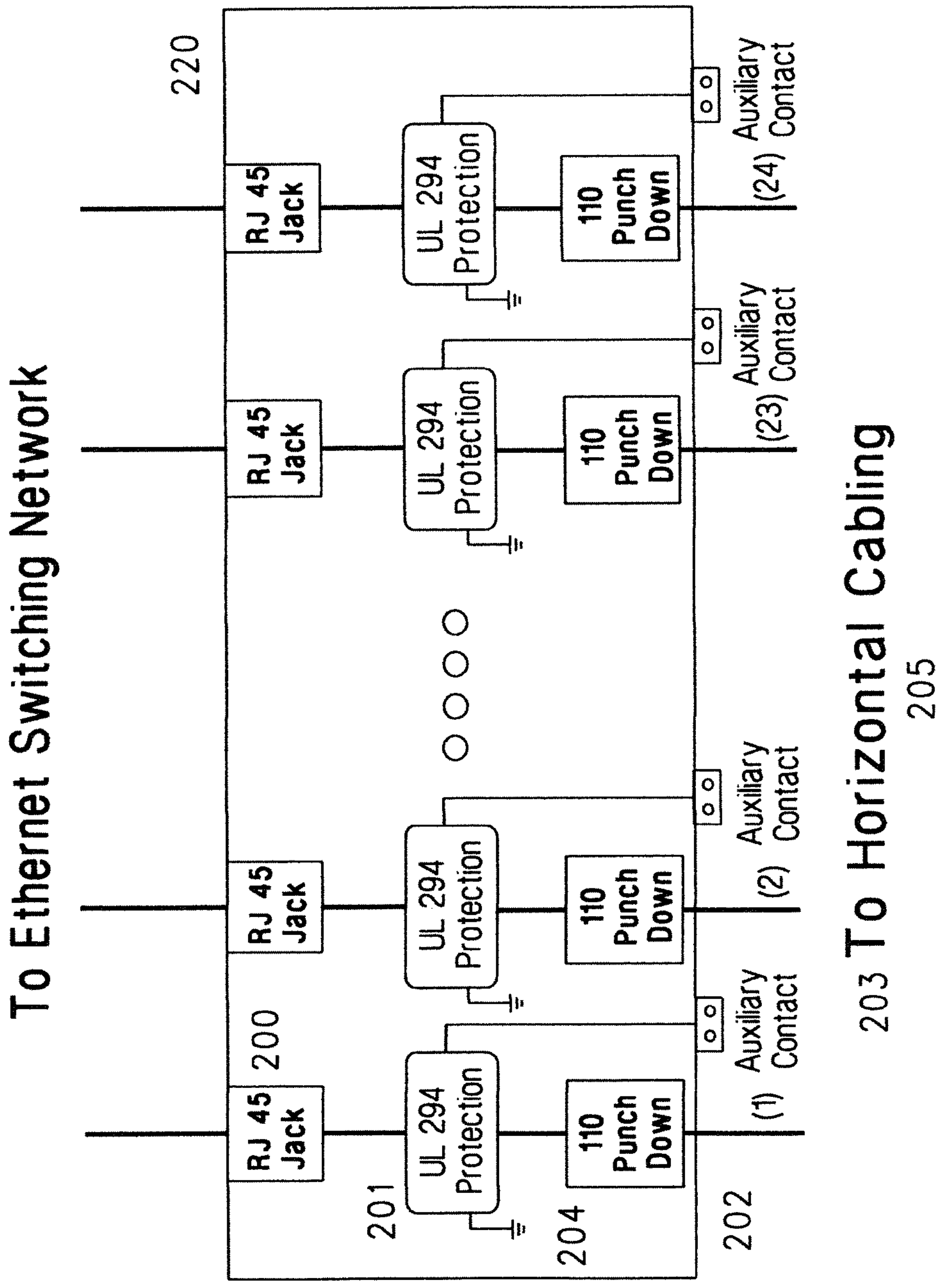
FIG. 2 shows a detailed view of an isolation patch panel according to one embodiment.

FIG. 2 shows a detailed view of the isolation patch panel 220 containing a protection circuit 201 that suppresses the transient voltage across any two wires of a communications cable without damaging communications ports on network equipment (not shown in FIG. 2) connected to the isolation patch panel 220. The isolation patch panel 220 has two connections: an input connection 200 and an output connection 202. The input connection 200 and output connection 202 may be an RJ 45-type jack 200 or a 110-punch down block-type connector. The input connection 200 and output connection 202 are connected through the protection circuit 201. The protection circuit 201 provides isolation between the input connection 200 and the output connection 202 using a magnetically coupled, capacitively coupled, or optically isolated circuit. Under normal operation, data passes bi-directionally through the isolation patch panel 100 with no interference. When a transient voltage is present on the horizontal cabling section 205 of the network, the protection circuit 201 diverts the excess voltage to a ground connection 204 of the isolation patch panel 220. The excess voltage is removed without affecting characteristics of the data communication line (e.g., the category 5/6 cable 105), such as impedance, balance, and crosstalk. Consequently, the network switch 102 and access controller (shown in FIG. 4) remain in operation while the transient voltage is suppressed. The protection circuit 201 also passes Power over Ethernet (PoE) power from the network switching side 206 to the horizontal cabling side 205. The network switching side 206 is more proximate to the network switch 102 than the horizontal cabling side 205.

Figure 3:
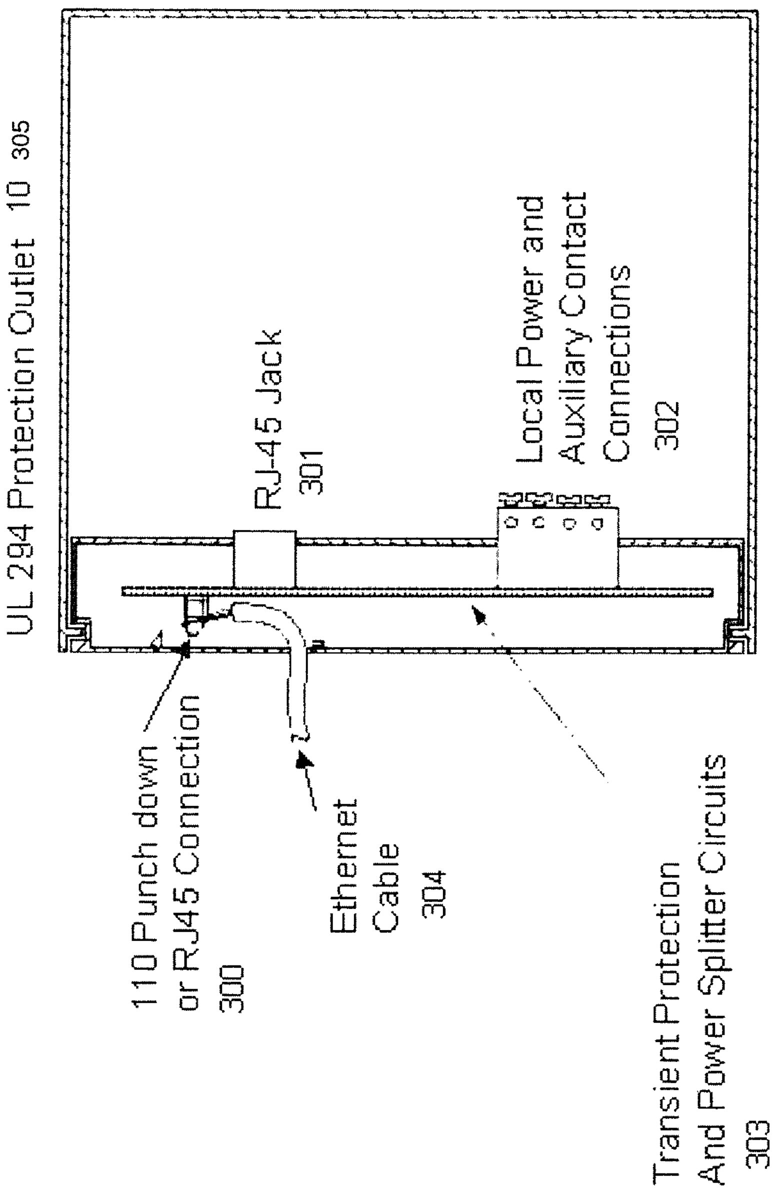
FIG. 3 shows a detailed view of the UL 294 protection outlet according to one embodiment.

Referring again to FIG. 1, the UL 294 protection outlet 101 can be located near the door 109 to protect TCP/IP connections (not shown) locally. The UL 294 protection outlet 101 uses the same protection circuit 201 as the isolation patch panel 100, but is remotely mounted in a double gang junction box. FIG. 3 shows a detailed view of one embodiment of the UL 294 protection outlet 305. The UL 294 protection outlet 305 suppresses transient voltages present on an Ethernet Cable 304 from damaging any access controllers connected to the Ethernet Cable 304 through the UL 294 protection outlet 305. The UL 294 protection outlet 305 includes transient protection and power splitting circuits 303, an input connection 300 of the RJ 45 or 110-punch down block type, and an RJ 45 jack 301. If the Ethernet Cable 304 is carrying power via PoE, one or more screw-down type local power and auxiliary contact connections 302 may be present in the UL 294 protection outlet 305. The local power and auxiliary contact connection 302 is adapted to supply power to a non-PoE enabled device such as the door lock 108 or the request to exit (REX) device 107 (see FIG. 1) or a credential reader (e.g., 400 shown in FIG. 4). If a transient voltage is present on the Ethernet cable 304, the transient protection circuit in the transient protection and power splitting circuits 303 discharges the transient voltage to a ground connection (not shown in FIG. 3).

Thus, the UL 294 protection outlet in combination with the isolation patch panel provides a means of transmitting an electrical signal, such as an electrical circuit closure, to an access controller across the same network cable carrying data signals and PoE. This functionality allows end users to install auxiliary contact control, data communication, transient voltage suppression and PoE over a single network cable via an isolation patch panel and provide remote connection points at the access controller location.

In the embodiment shown in FIG. 1, the network switch 102 provides PoE power to the isolation patch panel 100. The isolation patch panel 100 then passes the power to the UL 294 protection outlet 101. At the UL 294 protection outlet 101, circuitry (not shown) de-couples the power from the data signal and provides a termination point (not shown) for PoE power.

In another embodiment shown in FIG. 2, an auxiliary contact 203 is coupled to the isolation patch panel 220. The auxiliary contact 203 receives an auxiliary contact electrical signal. The isolation patch panel 220 passes the auxiliary contact electrical signal through the protection circuit 201 to a UL 294 protection outlet (such as UL 294 protection outlet 101 shown in FIG. 1 or UL 294 protection outlet 305 shown in FIG. 3) over a single network cable (such as network cable 105 or Ethernet cable 304 shown in FIG. 3). At the UL 294 protection outlet, a circuit (not shown) de-couples the auxiliary contact electrical signal from the data and power signals and provides a termination point for auxiliary contact (such as the local power and auxiliary contact connection 302 shown in FIG. 3) to the UL 294 protection outlet.

Figure 4:
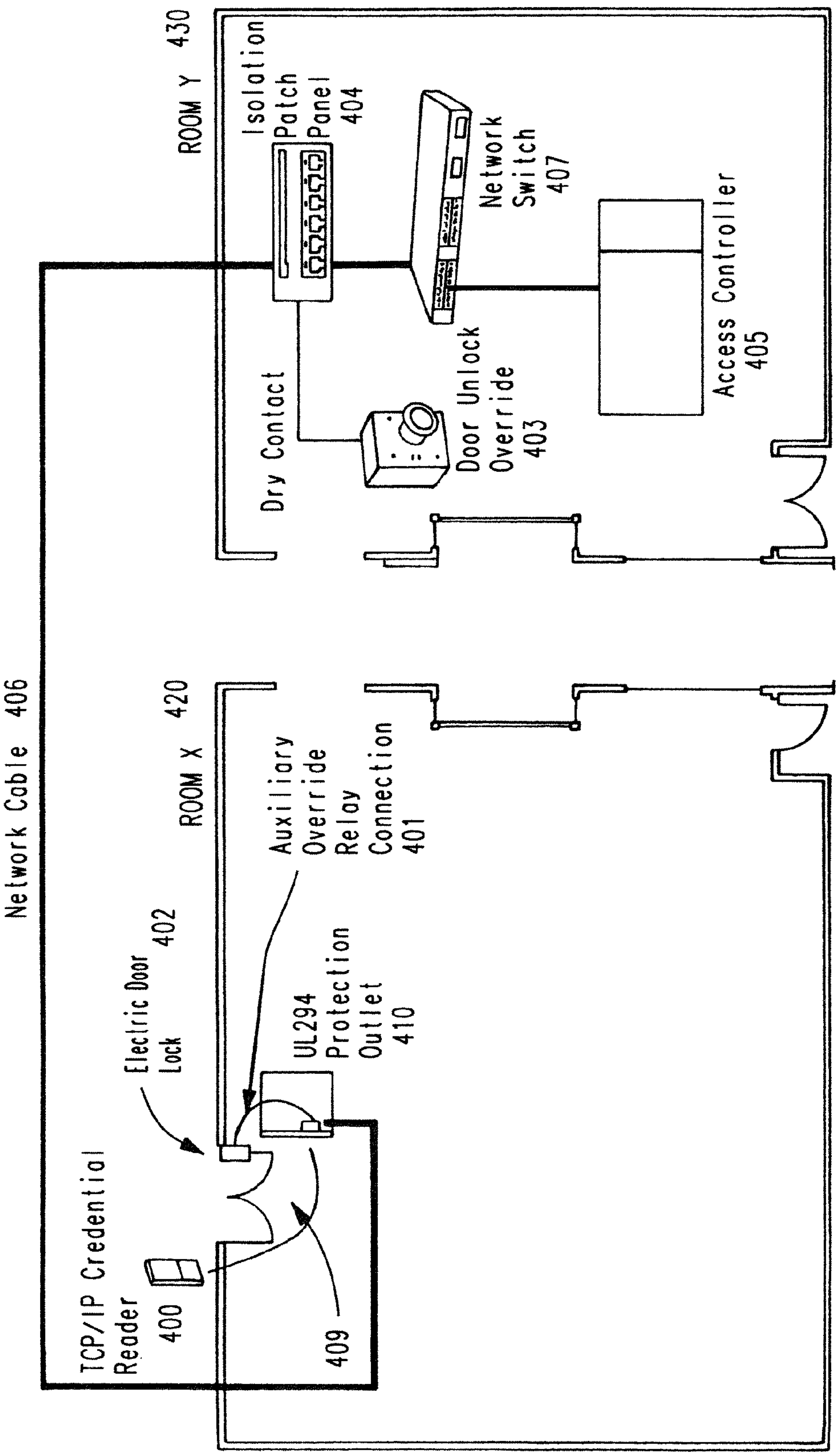
FIG. 4 illustrates the functionality of the auxiliary contact closure on the isolation patch panel and UL 294 protection outlet according to one embodiment.

FIG. 4 illustrates the functionality of the auxiliary contact closure on the isolation patch panel 404 and UL 294 protection outlet 410. In this embodiment, the network equipment room 430 (Room Y) contains the isolation patch panel 404, a network switch 407, an access controller 405, and a Door Unlock Override 403. The network switch is connected with the access controller 405. The Door Unlock Override 403 may be a manually activated device such as a button. When the Door Unlock Override 403 is activated, the circuit (e.g., 303 in FIG. 3) connected to the auxiliary contact connection (e.g., 302 in FIG. 3) on the protection outlet 410 closes, thereby unlocking the door 409 to Room X 420. The protection circuit (e.g., 204 in FIG. 3) in the isolation patch panel 404 passes the electrical signal to the protection outlet 410 via the network cable 406. At the UL 294 protection outlet 410, the electrical signal is transmitted through the protection circuit (not shown) in the protection outlet 410 to the auxiliary contact connection (e.g., 302 in FIG. 3) in the protection outlet 410. The electrical signal is then transmitted from the auxiliary contact connection (e.g., 302) through the auxiliary override relay connection 401 to the electric door lock 402. In one embodiment, when the Door Unlock Override 403 closes, the electric door lock 402 engages, thereby locking the door 409. When the Door Unlock Override 403 opens, the electric door lock 402 disengages, thereby unlocking the door 409.

In one embodiment of the network of FIG. 4, UL 294 isolation patch panel 404 is coupled to a network switch 407, which supplies PoE power to the electric door lock 402. When the Door Unlock Override 403 engages, the UL 294 isolation panel 404 stops the flow of power to the electric door lock 402 coupled to the UL 294 isolation patch panel 404, thereby sending the door 409 into its no power position, which is either locked or unlocked. When the Door Unlock Override 403 disengages, power is reconnected to the electric door lock 402 and the electric door lock 402 resumes normal operation. Similarly, a building fire alarm system, or any external electrical contact, can replace the Door Unlock Override 403. Thus, in another embodiment, a building fire alarm system (not shown) is coupled to the isolation patch panel 404 via a hardwire interconnection. When a fire alarm occurs, the building fire alarm system sends the alarm message to the isolation patch panel 404 via the opening or closing or an electric relay. The isolation patch panel 404 passes the electrical signal through the protection circuit (e.g., 201 in FIG. 2) to the UL 294 protection outlet 410. At the UL 294 protection outlet 410, the signal is transmitted through the protection circuit (not shown) to the auxiliary contact connection (e.g., 302) on the UL 294 protection outlet 410.

FIG. 4 also shows a TCP/IP credential reader 400 located in or near Room X 420. The isolation patch panel 404 protects the network switch 407 from a transient voltage. If a credential is presented to the TCP/IP credential reader 400, the information passes through the protection outlet 410, through the network cable 406 and the isolation patch panel 404 to the network switch 407. The information then passes through the network switch 407 to the access controller 405. If a transient voltage is introduced between the UL 294 protection outlet 410 and the isolation patch panel 404, the protection circuit (e.g., 201) in each device dumps the excess voltage to ground, preventing catastrophic failure of a network port (not shown) on the access controller 405, the network switch 407, and any devices connected to the auxiliary contact (e.g., 203 and 302) at both the isolation patch panel 404 and the protection outlet 410.

The invention claimed is:

1. A patch panel for dissipating voltage transients, said patch panel comprising:

a plurality of input connections;

a plurality of output connections;

at least one auxiliary contact for receiving an auxiliary contact electrical signal; and a plurality of protection circuits, each of said protection circuits providing isolation between one of said input connections and one of said output connections and directing high-voltage transients to ground, said protection circuits further adapted to accept said auxiliary contact electrical signal and pass it to a network cable connected to one of said output connections.

2. The patch panel of claim 1 wherein said auxiliary contact electrical signal is a door unlock override signal.

3. The patch panel of claim 1 wherein said protection circuit is a magnetically coupled circuit.

4. The patch panel of claim 1 wherein said protection circuit is a capacitively coupled circuit.

5. The patch panel of claim 1 wherein said protection circuit is an optically isolated circuit.

* * * * *